United States Patent [19]

Bayer et al.

[11] Patent Number: 5,514,348

[45] Date of Patent: May 7, 1996

[54] PLATED STEEL SHEET AND HOUSING INCLUDING THE SHEET

[75] Inventors: Jürgen Bayer, Esslingen; Klaus Haller, Stuttgart, both of Germany

[73] Assignee: Emitec Gesellschaft fuer Emissionstechnologie mbH, Lohmar, Germany

[21] Appl. No.: 262,465

[22] Filed: Jun. 20, 1994

Related U.S. Application Data

[62] Continuation of PCT/EP92/02925, Dec. 16, 1992.

[30] Foreign Application Priority Data

Dec. 19, 1991 [DE] Germany ............... 41 41 938.3

[51] Int. Cl.⁶ ............... B01D 50/00; B01D 53/34; B32B 15/00
[52] U.S. Cl. ............... 422/177; 422/180; 60/273; 60/282; 60/299; 428/683; 428/685
[58] Field of Search ............... 428/683, 685; 422/177, 168, 180; 60/273, 282, 299

[56] References Cited

U.S. PATENT DOCUMENTS

| | | | |
|---|---|---|---|
| 2,312,582 | 3/1943 | Patrick | 29/181 |
| 2,764,805 | 10/1956 | Mears | 29/196.1 |
| 3,640,755 | 2/1972 | Barth | 117/71 M |
| 3,762,884 | 10/1973 | Grisaffe et al. | 29/162.2 |
| 3,770,389 | 10/1973 | Kitzner et al. | 422/174 |
| 4,101,280 | 7/1978 | Frietzsche et al. | 23/288 |
| 4,250,146 | 2/1981 | Baily | 422/179 |
| 4,278,639 | 7/1981 | Tadokoro et al. | 422/171 |
| 4,344,922 | 8/1982 | Santiago et al. | 422/179 |
| 4,999,259 | 3/1991 | Hashimoto et al. | 428/685 |
| 5,094,821 | 3/1992 | Hitachi et al. | 422/180 |
| 5,110,561 | 5/1992 | Hitachi et al. | 422/180 |
| 5,190,732 | 3/1993 | Maus et al. | 422/179 |
| 5,366,139 | 11/1994 | Jha et al. | 228/193 |

FOREIGN PATENT DOCUMENTS

| | | |
|---|---|---|
| 2594732 | 8/1987 | France . |
| 1951141 | 5/1970 | Germany . |
| 2036682 | 2/1971 | Germany . |
| 2126546 | 12/1972 | Germany . |
| 1966816 | 7/1974 | Germany . |
| 728338 | 4/1955 | United Kingdom . |
| 1190638 | 5/1970 | United Kingdom . |
| 1443172 | 7/1976 | United Kingdom . |

*Primary Examiner*—Timothy M. McMahon
*Assistant Examiner*—N. Bhat
*Attorney, Agent, or Firm*—Herbert L. Lerner; Laurence A. Greenberg

[57] ABSTRACT

A plated steel sheet for producing housings or tubes or the like includes a foundation material forming a middle layer having first and second sides. A coating of an austenitic special steel is disposed on the first side. A coating of a ferritic special steel is disposed on the second side. In a housing for a catalytic converter being made of the plated steel sheet, the second side having the coating of ferritic special steel forms an inner surface of the housing.

3 Claims, 1 Drawing Sheet

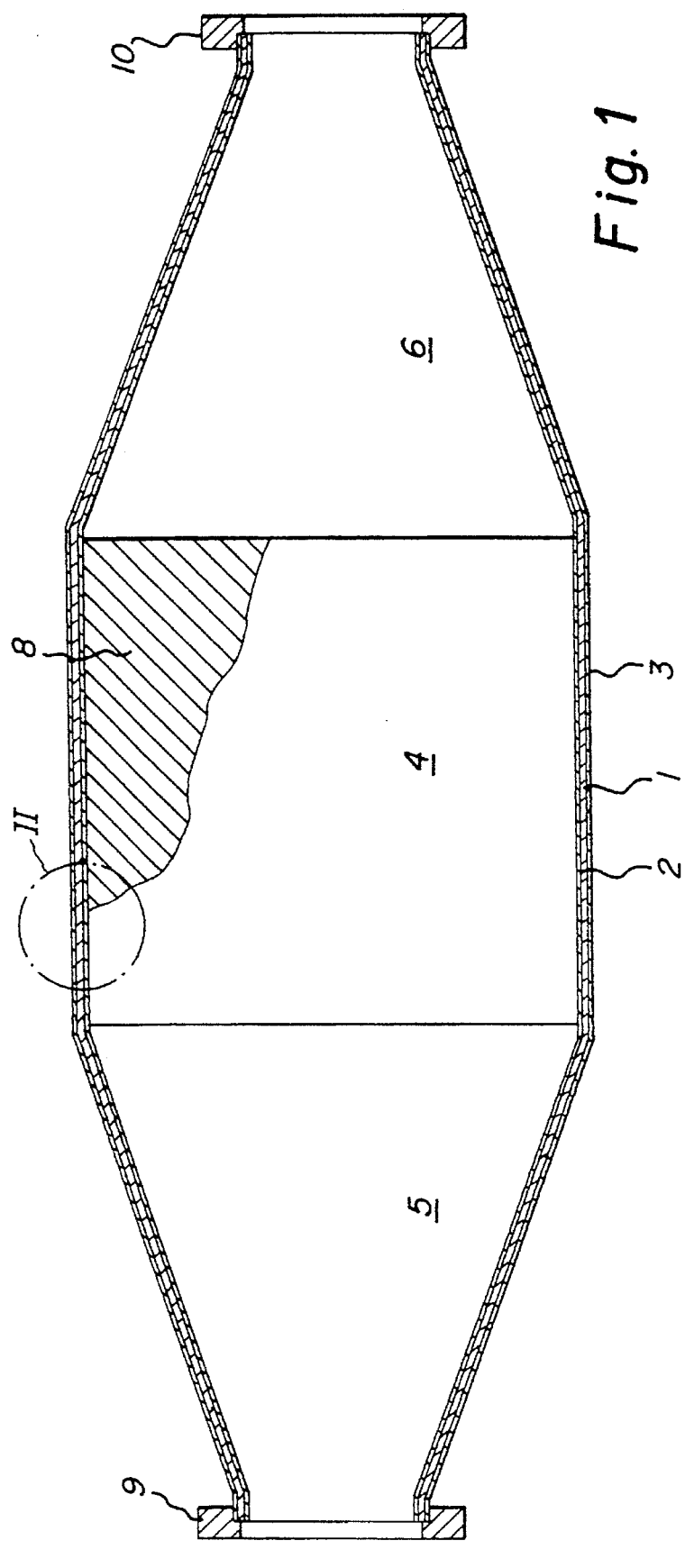
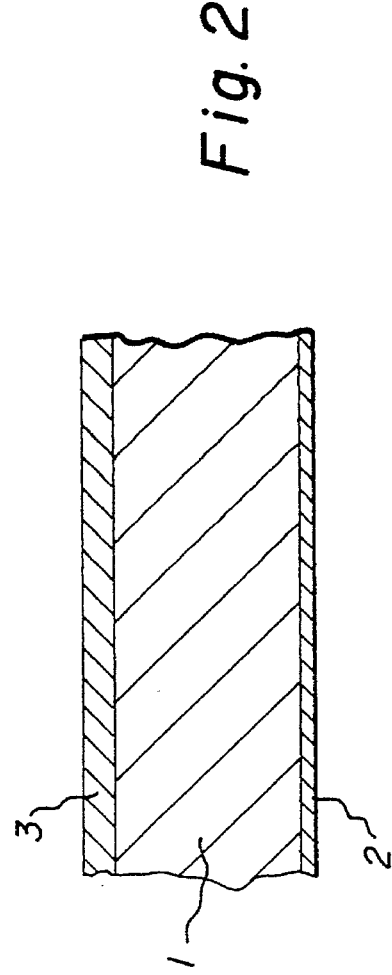
Fig. 1
Fig. 2

5,514,348

PLATED STEEL SHEET AND HOUSING INCLUDING THE SHEET

CROSS-REFERENCE TO RELATED APPLICATION

This application is a Continuation of International Application Ser. No. PCT/EP92/02925, filed Dec. 16, 1992.

BACKGROUND OF THE INVENTION

Field of the Invention

The invention relates to a plated steel sheet for producing housings or tubes or the like, having a foundation material forming a middle layer and coatings of special steel being disposed on both sides thereof. The invention also relates to a housing for a catalytic converter.

Plate steel sheets are used on one hand to obtain high corrosion resistance which matches that of the special steel being used and such steels are used on the other hand to reduce material costs. Moreover, plated sheet steel often has the advantage over special steel sheets of enabling better deformability to be obtained. The layer thickness of the coatings is approximately 10% of the total sheet thickness, as a rule.

A plated steel sheet for exhaust pipes that is already known from British Patent No. 1 443 172 has an internal coating of special steel and a corrosion-proof outer coating. The use of special combinations of steels for those coatings is not discussed.

SUMMARY OF THE INVENTION

It is accordingly an object of the invention to provide a plated steel sheet and a housing including the sheet, which overcome the hereinafore-mentioned disadvantages of the heretofore-known devices of this general type and which are suitable in particular for guiding or receiving hot exhaust gases of motor vehicles, such as catalytic converter housings or muffler housings in exhaust systems.

With the foregoing and other objects in view there is provided, in accordance with the invention, a plated steel sheet for producing housings or tubes or the like, comprising a foundation material forming a middle layer having first and second sides; a coating of an austenitic special steel disposed on the first side; and a coating of a ferritic special steel disposed on the second side.

As a result of this embodiment, it is possible to adapt the plated steel sheet to the special conditions of use. The layer which is later located on the inside is formed of a special steel which is resistant to hot-gas corrosion, and the outer layer is formed of a special steel which is resistant to wet corrosion. In the known plated steel sheets, the coatings are each formed of the same special steel, so that a compromise had to be found between hot-gas corrosion resistance and wet corrosion resistance. The material according to the invention is more economical than a solid special steel material, and moreover it lends itself better to construction for the particular application.

In accordance with another feature of the invention, the thickness of the coating on one side differs from the thickness of the coating on the other side. Once again, this enables further improved adaptation to the particular application. For instance, in catalytic converter housings or muffler housings or the like, it is possible to make the coating that will later be located on the outside from a thicker material than the inner coating. As a result, approximately the same service life can be assured for both coatings, because it can then be taken into account that the outer coating is not exposed only to wet corrosion but also to mechanical stresses from being struck with stones or sand or the like.

With the objects of the invention in view, there is also provided a housing for a catalytic converter, comprising a plated steel sheet including a foundation material forming a middle layer having a first side and having a second side forming an inner surface of the housing; a coating of an austenitic special steel disposed on the first side; and a coating of a ferritic special steel disposed on the second side.

In accordance with another feature of the invention, there is provided a carrier matrix of ferritic special steel being brazed onto the second side having the coating of ferritic special steel.

In accordance with a concomitant feature of the invention, the first side forms an outer surface of the housing, and the coating on the outer surface is thicker than the coating on the inner surface.

Other features which are considered as characteristic for the invention are set forth in the appended claims.

Although the invention is illustrated and described herein as embodied in a plated steel sheet and a housing including the sheet, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, longitudinal-sectional view of a catalytic converter housing made of a steel sheet according to the invention; and FIG. 2 is an enlarged, longitudinal-sectional view of a portion II of a wall of the catalytic converter housing of FIG. 1.

DESCRIPTION OF THE PREFERRED EMBODIMENTS

Referring now to the figures of the drawing in detail and first, particularly, to FIG. 1 thereof, there is seen a catalytic converter housing being formed of two shells that are joined together by a flange connection. The housing has a middle cylindrical or oval portion 4 in which a carrier matrix 8 for a catalytic material is disposed. Respective frustoconical portions 5, 6 which are disposed before and after the middle portion 4 terminate in annular flanges 9, 10. The catalytic converter housing can be inserted between lengths of pipe in an exhaust system by means of these annular flanges 9, 10.

The shells of the housing are formed from plated sheet steel that has a foundation material 1 provided on first and second sides thereof with coatings 3, 2 which are formed of different special steels. In particular, it is provided that the coating 2 forming an inner wall is made of a ferritic special steel. The carrier matrix 8 is likewise made from a ferritic special steel, so that a good bond between the carrier matrix 8 and the coating 2 can be achieved, particularly by brazing.

The coating 3 is preferably formed of an austenitic special steel.

The foundation material 1 of the steel sheet is formed of a special deep-drawing steel, for instance a steel of material No. 1.0338, which is alloyed with titanium. This foundation material is provided with the coatings 2, 3 that are plated onto both sides. Any conventional coating methods may be employed, such as cast plating and in particular roll bonding cladding. In order to adapt the plated steel sheet to special usage conditions, particularly for use as catalytic converter housings or muffler housings or the like in motor vehicle exhaust systems, the two coatings are formed of different special steels. Coating materials having material numbers 1.4016, 1.4113, 1.4510, 1.4742 and 1.4767, or in other words ferritic special steels, and those with material numbers 1.4301, 1.4401, 1.4541, 1.4571, 1.4828, 1.4841, and 1.4878, or in other words austenitic special steels, are used in particular. These special steels have different properties with respect to hot-gas corrosion resistance and wet corrosion resistance. In the present case, this is exploited in order to ensure that the coating that is later to be located on the outside and exposed to wet corrosion is made of a suitably wet corrosion resistant special steel, such as 1.4301 or 1.4541, while the inner coating is formed of a correspondingly hot-gas corrosion resistant special steel, such as 1.4742 or 1.4767.

As can be seen from FIG. 2, the coating 3 has a markedly greater thickness than the coating 2. In a catalytic converter housing or muffler housing in an exhaust system, it is provided that this coating 3 is located on the outside, since it is exposed not only to the corrosion stress but also to mechanical stresses from sand, stones or the like striking it. Due to the different layer thickness, despite this different stress it is possible to achieve a virtually identical service life for both of the coatings 2, 3.

What is claimed is:

1. A catalytic converter housing, comprising:

a plated steel sheet including:

a middle layer of deep drawing steel having a first side and having a second side, said second side forming an inner surface of the housing;

a coating of an austenitic special steel disposed on said first side; and a coating of a ferritic special steel disposed on said second side.

2. The housing according to claim 1, including a carrier matrix of ferritic special steel being brazed onto said second side having said coating of ferritic special steel.

3. The housing according to claim 1, wherein said first side forms an outer surface of the housing, and said coating on said outer surface is thicker than said coating on said inner surface.

* * * * *